United States Patent
Pawlowsky

(10) Patent No.: US 9,224,010 B2
(45) Date of Patent: Dec. 29, 2015

(54) SECURE DOCUMENT CREATION FROM POTENTIALLY UNSECURE SOURCE TEMPLATES

(75) Inventor: Marc A. Pawlowsky, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 591 days.

(21) Appl. No.: 13/224,076

(22) Filed: Sep. 1, 2011

(65) Prior Publication Data

US 2013/0061126 A1  Mar. 7, 2013

(51) Int. Cl.
*G06F 17/30* (2006.01)
*G06F 21/64* (2013.01)

(52) U.S. Cl.
CPC .......... *G06F 21/64* (2013.01); *G06F 17/30914* (2013.01)

(58) Field of Classification Search
None
See application file for complete search history.

(56) References Cited

U.S. PATENT DOCUMENTS

| | | | |
|---|---|---|---|
| 5,956,737 A * | 9/1999 | King et al. | 715/202 |
| 6,446,077 B2 * | 9/2002 | Straube et al. | 1/1 |
| 7,272,753 B2 | 9/2007 | Kaplan et al. | |
| 7,373,595 B2 | 5/2008 | Jones et al. | |
| 7,386,567 B2 | 6/2008 | Manikutty et al. | |
| 7,389,473 B1 * | 6/2008 | Sawicki et al. | 715/255 |
| 7,444,678 B2 | 10/2008 | Whitmer et al. | |
| 7,472,341 B2 * | 12/2008 | Albornoz et al. | 715/230 |
| 7,539,981 B2 | 5/2009 | Eilebrecht | |
| 7,559,080 B2 | 7/2009 | Bhargavan et al. | |
| 7,607,172 B2 | 10/2009 | Zurko et al. | |
| 7,624,373 B2 | 11/2009 | Pandit et al. | |
| 8,032,828 B2 | 10/2011 | Su et al. | |
| 2001/0039594 A1 * | 11/2001 | Park et al. | 709/311 |
| 2003/0061216 A1 * | 3/2003 | Moses | 707/9 |
| 2004/0205411 A1 | 10/2004 | Hong et al. | |
| 2004/0205573 A1 * | 10/2004 | Carlson et al. | 715/513 |

(Continued)

FOREIGN PATENT DOCUMENTS

| | | |
|---|---|---|
| CN | 1877525 A | 12/2006 |
| EP | 1 596 557 A2 | 11/2005 |

(Continued)

OTHER PUBLICATIONS

Canadian Office Action from Application No. 2,711,855, dated Nov. 9, 2010 (4 pages).

(Continued)

*Primary Examiner* — Charles Adams
(74) *Attorney, Agent, or Firm* — Shumaker & Sieffert, P.A.

(57) ABSTRACT

An illustrative embodiment of a computer-implemented method for generating secured documents using a source template is disclosed, in which a computer system receives the source template; converts the source template into a secured template comprising user-modifiable extension points, wherein the secured template is not user-modifiable outside of the user-modifiable extension points; receives a user input comprising one or more user-indicated modifications at one or more of the user-modifiable extension points; modifies the secured template into a custom document with modifications to the one or more user-modifiable extension points in accordance with the one or more user-indicated modifications; and transforms the custom document into a secured custom document that comprises the modifications to the one or more user-modifiable extension points and that is in a format that is executable using a source schema associated with the source template.

24 Claims, 5 Drawing Sheets

(56) References Cited

U.S. PATENT DOCUMENTS

| | | |
|---|---|---|
| 2005/0138606 A1 | 6/2005 | Basu et al. |
| 2006/0059169 A1* | 3/2006 | Armishev ............... 707/100 |
| 2006/0184548 A1* | 8/2006 | Meadows ............... 707/100 |
| 2006/0293919 A1* | 12/2006 | Morlet et al. ............... 705/2 |
| 2008/0148298 A1 | 6/2008 | Chatterjee et al. |
| 2009/0112901 A1 | 4/2009 | Friedman |
| 2010/0070562 A1* | 3/2010 | Boyer et al. ............ 709/203 |

FOREIGN PATENT DOCUMENTS

| | | |
|---|---|---|
| EP | 2 053 502 A2 | 4/2009 |
| WO | 2007/058882 A2 | 5/2007 |
| WO | 2011/037500 A1 | 3/2011 |

OTHER PUBLICATIONS

Karl Mazurak et al., "ABASH: Finding Bugs in Bash Scripts," PLAS '07 Proceedings of the 2007 Workshop on Programming Languages and Analysis for Security (2007) 10 pp. 105-114.

Lincoln D. Stein, "SBOX: Put CGI Scripts in a Box," Proceedings of the USENIX Annual Technical Conference, The USENIX Association, Jun. 1999 (23 pages).

U.S. Appl. No. 13/164,571, filed Jun. 20, 2011, Marc A. Pawlowsky.

Su et al. "XEM: Managing the Evolution of XML Documents", International Workshop on Research Issues in Data Engineering, Apr. 2, 2001, Heidelberg, Germany, (8 pages).

\* cited by examiner

SECURE DOCUMENT CREATION FROM POTENTIALLY UNSECURE SOURCE TEMPLATES

TECHNICAL FIELD

This disclosure relates generally to generating documents based on templates in a computer system.

BACKGROUND

Various desktop-based and web-based applications enable users to select from among a variety of pre-defined templates and modify one or more selected templates to generate a document such as a report, a graph, or a chart, or a document that includes one or more graphs or charts. These applications may be collectively referred to as document template applications. The templates may be defined as documents written in standardized protocols, such as Extensible Markup Language (XML). Various applications may include tools such as XML schemas and scripts for interpreting and executing XML documents. However, the potential exists for such tools to enable unsafe operations, such as accessing the file system of a computer or other computing resource. The potential for such unsafe operations may expose a computing environment to inadvertent errors or malicious activity, that may damage or compromise the security of computing resources or of data accessible to those computing resources.

BRIEF SUMMARY

According to one embodiment, a computer-implemented method for generating secured documents using a source template includes a computer system receiving the source template. The computer system converts the source template into a secured template comprising user-modifiable extension points, wherein the secured template is not user-modifiable outside of the user-modifiable extension points. The computer system receives user input comprising one or more user-indicated modifications at one or more of the user-modifiable extension points. The computer system modifying the secured template into a custom document with modifications to the one or more user-modifiable extension points in accordance with the one or more user-indicated modifications. The computer system transforming the custom document into a secured custom document that comprises the modifications to the one or more user-modifiable extension points and that is in a format that is executable using a source schema associated with the source template.

According to another embodiment, a computer system for generating secured documents using a source template is disclosed. The computer system includes one or more processors, one or more computer-readable memory elements and one or more computer-readable, tangible data storage devices. The computer system includes program instructions, stored on at least one of the one or more data storage devices for execution by at least one of the one or more processors, to receive the source template. The computer system includes program instructions, stored on at least one of the one or more data storage devices for execution by at least one of the one or more processors, to convert the source template into a secured template comprising user-modifiable extension points, wherein the secured template is not user-modifiable outside of the user-modifiable extension points. The computer system includes program instructions, stored on at least one of the one or more data storage devices for execution by at least one of the one or more processors, to receive a user input comprising one or more user-indicated modifications at one or more of the user-modifiable extension points. The computer system includes program instructions, stored on at least one of the one or more data storage devices for execution by at least one of the one or more processors, to modify the secured template into a custom document with modifications to the one or more user-modifiable extension points in accordance with the one or more user-indicated modifications. The computer system includes program instructions, stored on at least one of the one or more data storage devices for execution by at least one of the one or more processors, to transform the custom document into a secured custom document that comprises the modifications to the one or more user-modifiable extension points and that is in a format that is executable using a source schema associated with the source template.

According to another embodiment, a computer program product for generating secured documents using a source template is disclosed. The computer program product includes one or more computer-readable data storage devices having computer-readable program instructions stored on the one or more computer-readable tangible storage devices. The computer-readable program instructions include computer-readable program instructions to receive the source template; computer-readable program instructions to convert the source template into a secured template comprising user-modifiable extension points, wherein the secured template is not user-modifiable outside of the user-modifiable extension points; computer-readable program instructions to receive a user input comprising one or more user-indicated modifications at one or more of the user-modifiable extension points; computer-readable program instructions to modify the secured template into a custom document with modifications to the one or more user-modifiable extension points in accordance with the one or more user-indicated modifications; and computer-readable program instructions to transform the custom document into a secured custom document that comprises the modifications to the one or more user-modifiable extension points and that is in a format that is executable using a source schema associated with the source template.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
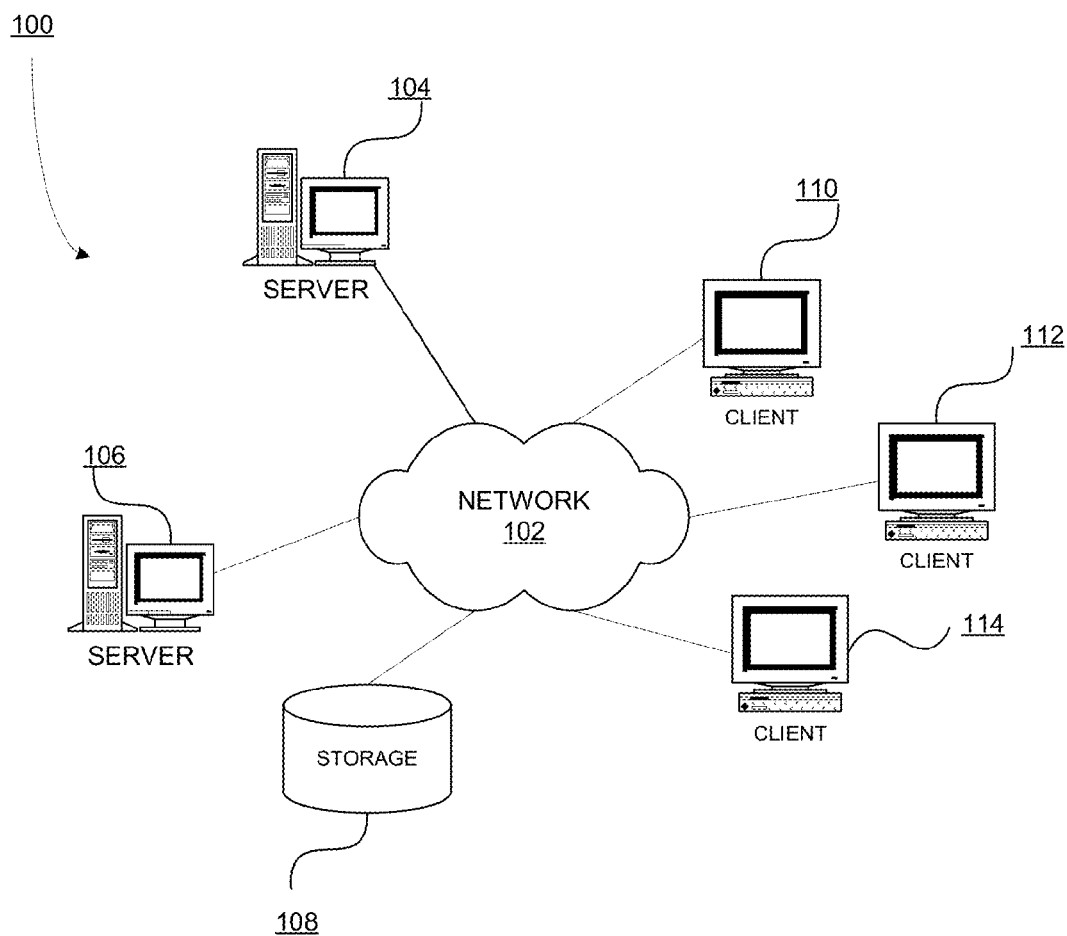
FIG. 1 is a block diagram of an exemplary network of computer systems operable for various embodiments of the disclosure.

There is set forth herein a computer system, method, and program product for use in creating secure documents from potentially unsecure templates. Various embodiments disclosed herein may enable a user to use multiple document template applications together for generating reports, graphs, or charts, to leverage the particular strengths of each of multiple document template applications, while providing a single security framework to address any potential security weaknesses in each of the multiple applications, among various other advantages.

As will be appreciated by one skilled in the art, aspects of the present invention may be embodied as a device, a system, a method, or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable data storage devices that include computer-readable medium(s) having computer readable program code embodied thereon. For example, a computer-readable data storage device may be embodied as a tangible device that may include a tangible, non-transitory data storage medium, as well as a controller configured for receiving instructions from a resource such as a central processing unit (CPU) to retrieve information stored at one or more particular addresses in the tangible, non-transitory data storage medium, and for retrieving and providing the information stored at those particular one or more addresses in the data storage medium.

The data storage device may store information that encodes both instructions and data, for example, and may retrieve and communicate information encoding instructions and/or data to other resources such as a CPU, for example. The data storage device may take the form of a main memory component such as a hard disc drive or a flash drive in various embodiments, for example. The data storage device may also take the form of another memory component such as a RAM integrated circuit or a buffer or a local cache in any of a variety of forms, in various embodiments. This may include a cache integrated with a controller, a cache integrated with a graphics processing unit (GPU), a cache integrated with a single instruction multiple data (SIMD) processor, a cache integrated with a bus or communication fabric, a cache integrated with a multi-chip die, a cache integrated within a CPU, processor registers within a CPU, or processor registers within a particular arithmetic logic unit (ALU) of a processor, as various illustrative examples. The data storage apparatus or data storage system may also take a distributed form such as a redundant array of independent discs (RAID) system or a cloud-based data storage service, and still be considered to be a data storage component or data storage system as a part of or a component of an embodiment of a system of the present disclosure, in various embodiments.

Any combination of one or more computer readable medium(s) may be utilized. The computer readable medium may be a computer readable storage medium, for example. A computer readable storage medium may be, for example, but is not limited to, an electronic, magnetic, optical, electromagnetic, infrared, electro-optic, heat-assisted magnetic, or semiconductor system, apparatus, or device, or any suitable combination of the foregoing. More specific illustrative, non-exhaustive examples of the computer readable storage medium include the following: an electrical connection having one or more wires, a portable computer diskette, a hard disc, a random access memory (RAM), a read-only memory (ROM), an erasable programmable read-only memory (EPROM or Flash memory), an optical fiber, a portable compact disc read-only memory (CD-ROM), a portable digital versatile disc read-only memory (DVD-ROM), an optical storage device, a magnetic storage device, or any suitable combination of the foregoing. In the context of this disclosure, a computer readable storage medium may be any tangible medium that can contain or store a program for use by or in connection with an instruction execution system, apparatus, or device, for example.

Program code embodied on a computer readable medium may be transmitted using any appropriate medium, including but not limited to radio frequency (RF) or other wireless, wireline, optical fiber cable, etc., or any suitable combination of the foregoing.

Computer program code for carrying out operations for aspects of the present invention may be written in any combination of one or more programming languages, including an object oriented programming language such as Java, Smalltalk, C++, or the like, or conventional procedural programming languages such as the C programming language or similar programming languages, or functional languages such as Haskell, Common Lisp, or Clojure, or multi-paradigm languages such as Python, Ruby, or Scala, among a variety of illustrative examples. The program code may execute entirely on the user's computer, partly on the user's computer, as a stand-alone software package, partly on the user's computer and partly on a remote computer, or entirely on one or more remote computers or servers, among various examples. In the latter scenario, the remote computer may be connected to the user's computer through any type of network, including a local area network (LAN) or a wide area network (WAN), or the connection may be made to an external computer (for example, through a packet data network such as the Internet using an Internet Service Provider).

In various illustrative embodiments, various software applications, modules, or other software elements may be executed in connection with a browser being executed on a client computing device that interacts with one or more web server applications that may be running on one or more server devices and may be executing or accessing other software applications, modules, databases, data stores, or other software elements or data structures. A browser may be executed on a client computing device and may access web applications from the one or more web server applications, for example. Various content within the web pages may be rendered or executed in or in association with the web browser using HTML, HTML5, CSS, CSS3, JavaScript, XML, AJAX, JSON, and various other languages or technologies, while other content may be provided by software applications, modules, or other elements executed on the one or more web servers and written in any programming language and/or using or accessing any software elements, data structures, or technologies, in various illustrative embodiments.

Aspects of the present invention are described below with reference to flowchart illustrations and/or block diagrams of methods, devices, systems, and computer program products according to embodiments of the invention. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable computer system to produce a machine, such that the instructions, which execute via the processor of the computer or other programmable data processing apparatus, may create means for implementing the functions or acts specified in the flowchart and/or block diagram block or blocks.

These computer program instructions may also be stored in a computer-readable medium that can be executed by a computing system such as a computer, other programmable data processing apparatus, or other devices to direct the computing system to function in a particular manner, such that the instructions stored in the computer-readable medium produce an article of manufacture including instructions which implement the function or act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions or acts specified in the flowchart and/or block diagram block or blocks.

Figure 2:
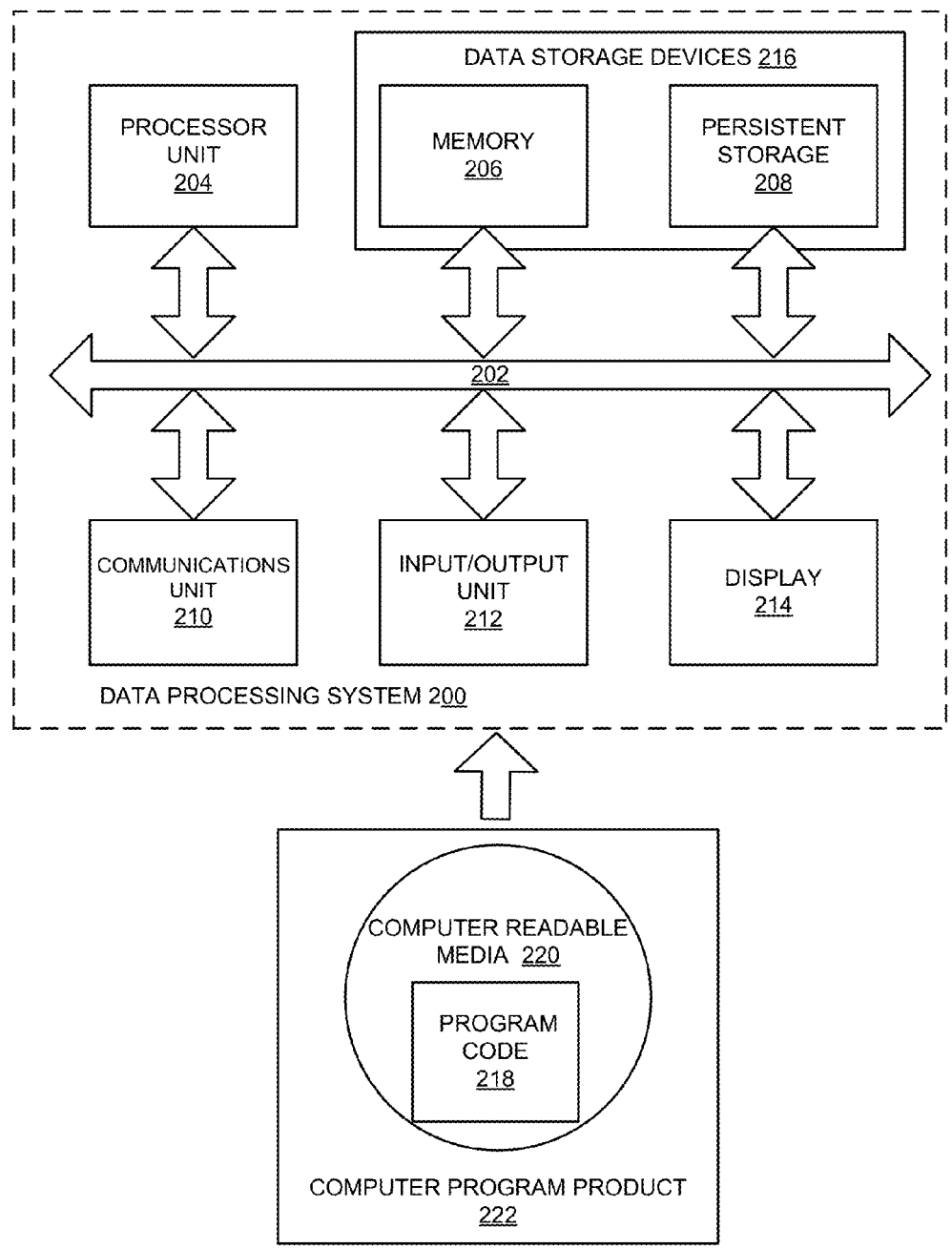
FIG. 2 is a block diagram of an exemplary computer system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of computer systems in which illustrative embodiments may be implemented. Network computer system 100 is a network of computers in which the illustrative embodiments may be implemented. Network computer system 100 contains network 102, which is the medium used to provide communications links between various devices and computers connected together within network computer system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network computer system 100 may include additional servers, clients, and other devices not shown.

In the depicted example, network computer system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network computer system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 depicts a block diagram of an exemplary computer system 200 operable for various embodiments of the disclosure. In this illustrative example, computer system 200 includes communications fabric 202, which provides communications between processor unit 204, memory 206, persistent storage 208, communications unit 210, input/output (I/O) unit 212, and display 214. Computer system 200 can be a workstation, server, mainframe computer, desktop computer, notebook or laptop computer, tablet computer, mobile phone, wireless device, set-top box, or other programmable data processing apparatus, or a portion of any of the above. Other possibilities for computer system 200 are possible, including a computer having capabilities other than those described herein and possibly beyond those capabilities.

Communications fabric 202 may include a dedicated system bus, a general system bus, multiple buses arranged in hierarchical form, any other type of bus, bus network, switch fabric, or other interconnection technology. Communications fabric 202 can support transfer of data, commands, and other information between various subsystems of computer system 200.

Processor unit 204 executes instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type. Processor unit 204 may be or include a reduced instruction set computing (RISC) microprocessor, an x86 compatible processor, or any other suitable processor. In other embodiments, processor unit 204 may comprise one or more CPUs or other processors distributed across one or more locations, such as on a client and a server, for example.

Memory 206 and persistent storage 208 are examples of data storage devices 216. A storage device is any piece of hardware that is capable of storing information, such as, for example and without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard disc drive, a flash memory, a rewritable optical disk, a rewritable magnetic tape, or some combination of the above. The media used by persistent storage 208 also may be removable. For example, a removable or external hard disc drive may be used for persistent storage 208. Memory 206 and persistent storage 208 may be arranged in a hierarchy of caches and in other memory devices, in a single physical location, or distributed across a plurality of physical systems in various forms. Memory 206 can also serve as a store for a governance module, a deployment module, an asset management repository, a configuration management database, and other modules and elements. Various embodiments may be implemented in a distributed computing environment having a plurality of computers communicating via a suitable network 102 of network computer system 100, as in FIG. 1.

Communications unit 210, in these examples, provides for communications with other computer systems or devices. In these examples, communications unit 210 includes a network interface card. Communications unit 210 may provide communications through the use of either or both of physical and wireless communications links. Communications unit 210 can be used for operationally connecting many types of peripheral computing devices to computer system 200, such as printers, bus adapters, and other computers. Communications unit 210 may include a network interface that provides a physical interface to a network 102 as in FIG. 1, such as a local area network (LAN) or the Internet. Communications unit 210 may include any type of adapter that provides an interface between computer system 200 and network 102, such as an Ethernet adapter, or a Token Ring adapter, or a modem that can be connected to a transmission system such as a telephone line, for example. In another example, computer system 200 can be connected to a network server via a LAN using an appropriate network protocol and the network server can in turn be connected to the Internet.

Input/output unit 212 allows for input and output of data with other devices that may be connected to computer system 200. For example, input/output unit 212 may provide a connection for user input through a keyboard, a mouse, a touchscreen, and/or some other suitable input device. Further, input/output unit 212 may send output to a printer. Display 214 provides a mechanism to display information to a user. Display 214 may include a video display device, which may be an LCD display, a cathode-ray tube display, or a display based upon other suitable display technology. Display 214 may also include a display interface that supports the video display device.

Storage devices 216 are in communication with processor unit 204 through communications fabric 202. Storage devices 216 may store instructions for the operating system, application programs, application data, and other data. In these illustrative examples the instructions are in a functional form on persistent storage 208. These instructions may be loaded into memory 206 for execution by processor unit 204.

The operating system may provide functions such as device interface management, memory management, and multiple task management. Other programs can include server software applications in which communications unit 210 includes a network interface that interacts with the server software applications to enable computer system 200 to function as a network server 104 via network 102 as in FIG. 1. In other examples, data storage devices 216 may store applications that enable computer system 200 to act as a client 110 and interact with server 104 over network 102 as in FIG. 1.

Processor unit 204 may perform the processes of the various embodiments by using computer-implemented instructions, which may be located in a memory, such as memory 206. These instructions may be referred to as program code, computer-usable program code, computer-executable instructions, or computer-readable program code that may be read and executed by a processor in processor unit 204. The program code in the different embodiments may be embodied on different physical or tangible computer-readable media, such as memory 206 or persistent storage 208.

Program code 218 is located in a functional form on computer readable media 220 that is selectively removable and may be loaded onto or transferred to computer system 200 for execution by processor unit 204. Program code 218 and computer readable media 220 are included in computer program product 222 in these examples. In one example, computer readable media 220 may be in a tangible form, such as, for example, an optical or magnetic disc that is inserted or placed into a disc drive or other device that is part of persistent storage 208 for transfer onto a storage device, such as a hard disc drive that forms another part of persistent storage 208. In a tangible form, computer-readable media 220 also may take the form of a storage media of persistent storage, such as a magnetic hard disc drive, a CD-ROM or DVD-ROM, a thumb drive, a flash memory, or other removable or non-removable media that is connected to computer system 200. The tangible form of computer-readable media 220 may also, in some embodiments, be referred to as computer-recordable storage media.

Alternatively, program code 218 may be transferred to computer system 200 from computer-readable media 220 through a communications link to communications unit 210 and/or through a connection to input/output unit 212. The communications link and/or the connection may be physical or wireless in various illustrative examples. The computer-readable media also may take the form of non-tangible media, such as communications links or wireless transmissions containing the program code.

In some illustrative embodiments, program code 218 may be downloaded over a network to persistent storage 208 from another device or computer system for use within computer system 200. For instance, program code stored in a computer-readable storage medium in a server computer system may be downloaded over a network from the server to computer system 200. The computer system providing program code 218 may be a server computer, a client computer, or some other device capable of storing and transmitting program code 218.

According to an illustrative embodiment using computer system 200 of FIG. 2 as an example, processor unit 204 executes a computer-implemented process for generating secured documents created using a source template. Processor unit 204 receives a source template and an associated source schema through communications unit 210, input/output unit 212, or storage devices 216. Processor unit 204 converts the source template into a secured template comprising user-modifiable extension points, wherein the template is not user-modifiable outside of the extension points. The secured template may be stored in storage devices 216. Processor unit 204 may provide the secured template to a user interface, which may be part of input/output unit 212 or may be accessed through communications unit 210. Processor unit 204 receives, through input/output unit 212 or communications unit 210, a user input comprising one or more user-indicated modifications at one or more of the extension points. Processor unit 204 modifies the secured template into a custom document with modifications to the one or more extension points in accordance with the user-indicated modifications. Processor unit 204 transforms the custom document into a secured custom document that comprises the modifications to the one or more extension points and that is in a format that is executable using the source schema. The user input, custom document, and secured custom document may also be stored in storage devices 216.

In an alternative embodiment, program code 218 of FIG. 2 containing the computer-implemented process may be stored within computer readable media 220 as computer program product 222. In another illustrative embodiment, the process for generating secured documents created using a source template may be implemented in a system or apparatus comprising a communications fabric 202, a communications unit 210 connected to the communications fabric 202, an input/output unit 212 connected to the communications fabric 202, a display 214 connected to the communications fabric 202, a processor unit 204 connected to the communications fabric 202, and a memory 206 that contains computer executable program code and is connected to the communications fabric 202. The processor unit 204 of the apparatus executes the computer executable program code to direct the apparatus to perform the process.

Figure 3:
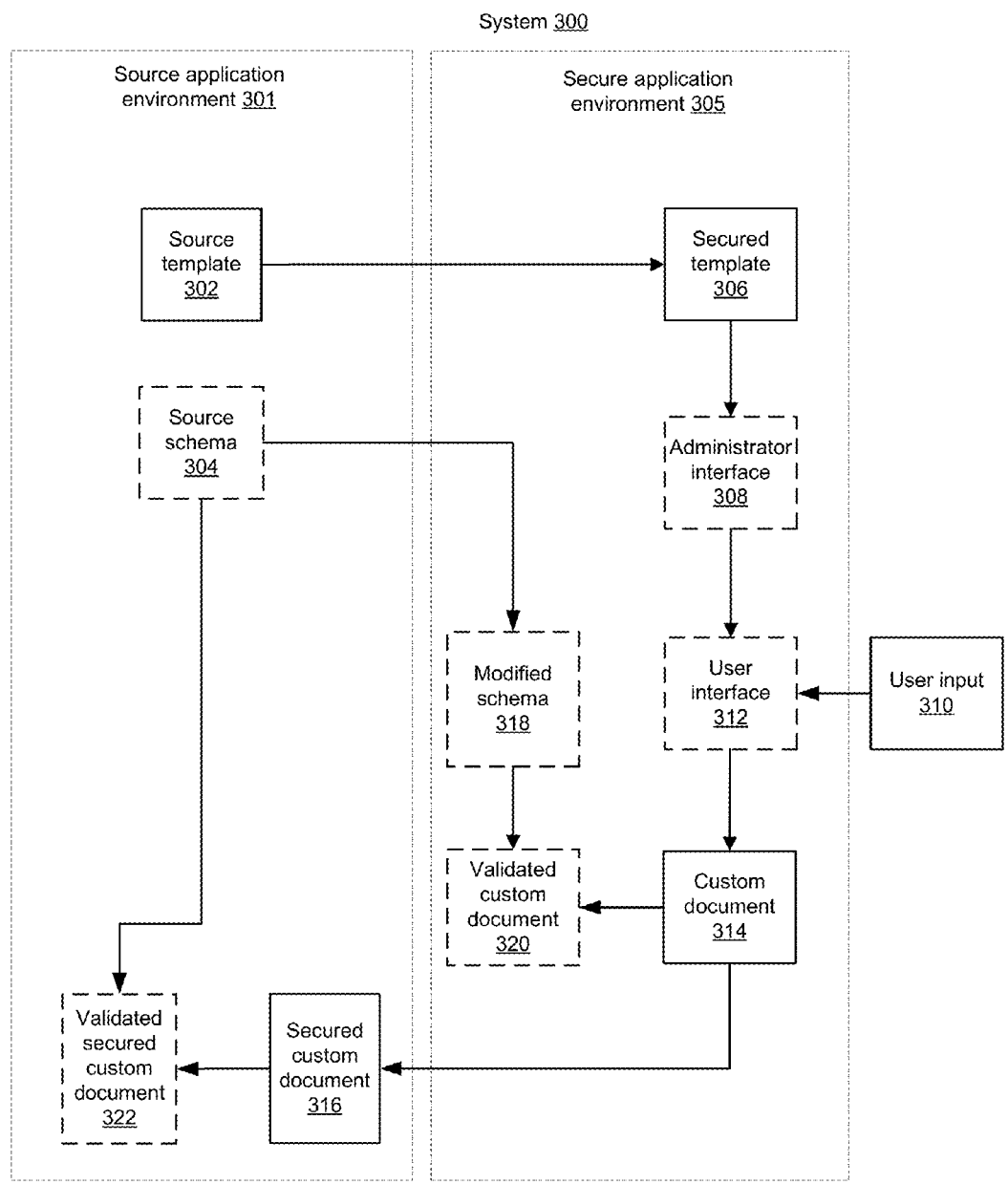
FIG. 3 is a block diagram of a secure document creation system in accordance with various embodiments of the disclosure.

FIG. 3 depicts a block diagram of a system 300 for generating secured documents in accordance with various embodiments of the disclosure. System 300 comprises a number of interconnected components working in cooperation with an underlying operating system software and hardware, such as described above with reference to FIGS. 1 and 2. System 300 comprises a source application environment 301 and a secure application environment 305. System 300 components include source template 302, secured template 306, user interface 312, custom document 314, and secured custom document 316. System 300 receives user input 310 via user interface 312. Source schema 304, administrator interface 308, user interface 312, modified schema 318, validated custom document 320, and validated secured custom document 322 are optional components and may or may not be included in different embodiments of system 300.

Source application environment 301 comprises source template 302, source schema 304, secured custom document 316, and validated secured custom document 322. Secure application environment 305 comprises secured template 306, administrator interface 308, user interface 312, custom document 314, modified schema 318, and validated custom document 320.

System 300 may be comprised entirely in secure application environment 305, which receives source template 302 and user input 310 as inputs, and generates secured custom document 316 as its output. Source application environment 301 may or may not be included as part of system 300 in various embodiments. Processes performed by system 300 may be completed with the generation of secured custom document 316 as the output of secure application environment 305.

A specific example implementation of system 300 may use IBM SPSS®, a desktop computer application program for statistical analysis, as source application environment 301, and IBM Cognos®, a web-based computer application program for business intelligence, as secure application environment 305 that may be used to create secured custom SPSS documents based on SPSS templates.[1] This example may be implemented in IBM Cognos to take a visualization template generated by SPSS Visualization Designer and programmatically replace parts of it under a report author's direction. For example, the visualization template may indicate a default that a title is to be red, but the report author can indicate that the title should instead be blue. SPSS may generate reports based on the visualization template. IBM Cognos may use SPSS and a predefined template to generate a chart. A system administrator may create standard visualization templates, and report authors can then override parts of the template, in a secure manner, to customize it on a report by report basis. In this example implementation, IBM SPSS may provide an example of source application environment 301 in FIG. 3, while IBM Cognos may provide an example of secure application environment 305 in FIG. 3.

[1] IBM, SPSS, and Cognos are trademarks of International Business Machines Corp., registered in the U.S. and many jurisdictions worldwide.

Various other examples may be used in cases where a source tool provides a source template such as an XML document that a user wants to modify based on instructions from an unsecured source. The source tool is associated with another source tool to process the document. The interpretation of the document will provide access to system resources that may be harmful, in the absence of a method of generating secured documents using the source template. For example, the reading of files is based on a path in the file system. Thus, generating secured documents using the source template requires a method that only allows specific parts of the source template to be changed. For example, it would be safe to allow a user to change a color in the template, but not to allow a user to modify a file path. The method for generating secured documents using the source template may be done without modifying the tool for creation the XML document, nor the tool for interpreting the document. The XML content that is to be changed from the source template may include attributes, or text, or elements which may contain attributes, text or other elements. For example, file paths in the source template are made non-user-modifiable in the secured template. The secured template may allow a report author to give only a file name, instead of a file path, and the secure modification application program may define the file path for the file name automatically and in a secured way.

The source template may be modified to indicate which parts may be changed, such as in a secured template comprising user-modifiable extension points. The source schema may be modified to be able to validate the modified document. A tool may be provided that will take the modified document, such as the secured template, and the user-indicated modifications, and produce a secured custom document that can be processed by the source interpreter. The source schema may be modified to accept the extensions indicating the modified parts. By controlling the modification points, an untrusted client cannot insert malicious code.

Various implementations may include a process for modifying an XML document to indicate which parts may be substituted; a process for modifying an XML schema to validate documents created with a modified XML document; a process for making substitutions in the modified XML document; a process for transforming a modified XML document having substitutions to a document that may be understood with the modified XML schema; and a process for allowing the modification of a source XML document by an untrusted party such that all modifications are safe, for example.

Methods such as these may be contrasted with accepting a whole template, such as entire XML document, passed in by a client for interpretation. Since such a document may contain dangerous content, it would be necessary to be able to fully understand the document and ensure that there is no dangerous content. This is akin to understanding Visual Basic scripts in a Microsoft Word document, a problem space that still allows malicious content in current practical implementations.

Further details of one example implementation using IBM SPSS and IBM Cognos are provided as follows. This example implementation includes modifying a schema to indicate extension points; creating an SPSS visualization template; running a tool that changes the SPSS visualization template to an IBM Cognos visualization template; selecting parts of the template that may be customized; creating an IBM Cognos report specification; and using the IBM visualization template to generate an SPSS visualization template.

A template designer may modify a schema to indicate extension points. The template designer manually modifies XML to convert a visualization template from SPSS to IBM Cognos. An XML schema is desirable in order to minimize the chances of mistakes being made in the creation of the IBM Cognos visualization template. The implementation described in this example is done through a program to allow for easy changes in what is extensible in a consistent manner. In addition it would allow for easy changes if the SPSS visualization template schema changes; rerunning the program would generate a new IBM Cognos visualization template that is compatible with the new SPSS visualization template schema.

In this example, steps are provided for created a schema based on copying and then modifying the existing SPSS visualization template schema. Other examples may include different, more, or fewer steps, or a re-ordering of the steps provided here.

The first step includes modifying the targetNamespace of the schema from the SPSS namespace to the IBM Cognos namespace. All references to the SPSS namespace are changed to the IBM Cognos namespace. The second step includes examining the nodes in the schema and finding the parts that represent XML nodes in the generated documents where modification is permitted. For example, the value of an attribute "color2" can be modified by a report author, if the template author permits them to do so.

For the nodes that can be modified, this step includes adding an attribute in the node definition indicating the type. For example,
<xs:attribute name="color2" type="vis:color".>
becomes
<xs:attribute name="color2" type="vis:color" vis:sts_propertyType="color"/>.

The third step includes expanding references in the schema in place. For example,
<xs:attributeGroup ref="vis:lineAttributes"/>
is replaced with all the attribute definitions that make up the group. Simple types are modified to contain an element that will contain the original simple type. For example,
<xs:element name="foo" type="xs:string"/>
becomes

```
<xs:element name="foo">
    <xs:complexType>
        <xs:sequence>
            <xs:element name="sts_value" type="xs:string"/>
        <xs:sequence>
    <xs:/complexType>
</xs:element>
```

Attribute declarations are converted to element declarations that will hold the same type. For example:
<xs:attribute name="lang" type="xs:language">
becomes

```
<xs:element name="lang" minOccurs="0">
    <xs:complexType>
        <xs:sequence>
            <xs:element name="sts_value" type="xs:language"/>
        </xs:sequence>
    </xs:complexType>
</xs:element>
```

Style elements which are references to common styles defined within a visualization template, such as in SPSS, are now modified so the style elements are under the element they are modifying. This allows for there to be multiple elements that referenced the same style not to allow the same property to be customizable. For example, in an SPSS visualization template, there may be an X-axis and a Y-axis that referenced the same style, that had a color attribute set to red. In the SPSS visualization template there could be one definition for the style, and both the X and Y axis would refer to the style. By requiring the styles be in a one-to-one relationship with the elements they are styling, an IBM Cognos template author can allow just the X-axis color to be customizable, while not allowing the Y-axis color to be changed. An alternative would be for the template author to allow both axes to be customizable, and the report author to customize each axis differently.

The process further includes adding element definitions for localized customizable names. IBM Cognos template authors need the ability to indicate in a meaningful manner what are the properties that may be customized by a report author. To do this the schema is modified to allow localized names wherever a customizable node was detected. This may be done by adding the vis:sts_names element like in the example below:

```
<xs:element name="dimension" minOccurs="0">
    <xs:complexType>
        <xs:sequence>
            <xs:element ref="vis:sts_names" minOccurs="0"/>
            <xs:element name="sts_value"
                type="xs:nonNegativeInteger"/>
        </xs:sequence>
    </xs:complexType>
</xs:element>
```

For creating the SPSS visualization template, using the tools provided in SPSS, a chart designer creates a Visualization Template that will be the basis of the template that can be customized in IBM Cognos. The process then includes running a tool to change SPSS Visualization Template to IBM Cognos Visualization template. An IBM Cognos tool converts an SPSS Visualization template into an IBM Cognos visualization template so it matches the schema created earlier. The namespace of the document is changed to the IBM Cognos namespace; schema location is removed from the document; sts_names elements are inserted into the document wherever a localized name to be displayed to the report author is permitted; style references are inlined under the elements they are modifying; attributes are converted to child elements under the element that they belonged to; and elements that may be customizable are then marked as such. For example, all elements with the name "color" can be customized. Under such elements, a child element sts_propertyType is created with text containing "color" to indicate the type of the content that may be customized.

For purposes of external reference later on, the customizable element is given an id attribute if it does not already have one. For elements that are allowed sts_names, a default name is given. For example:

```
<color>
    <sts_names>
        <sts_name>
        <sts_locale/>
        <sts_displayName>color4</sts_displayName>
        </sts_name>
    </sts_names>
    ...
```

The process further includes selecting parts of a template that may be customized. The IBM Cognos template author now can edit the XML created earlier using an XML Editor. The template author can customize the sts_names to add additional locales and change the default name. In addition the template author should remove the sts_propertyType elements for the parts of the template they do not want a report author to customize. The template author may use an authorization not available to an ordinary report author user, such as an administrator authorization, to select initially customizable or user-modifiable extension points to make non-user-modifiable.

The computing system may then receive user input from a report author to create an IBM Cognos report specification. A report author may use authoring tools, such as IBM Cognos Report Studio, to create an IBM Cognos report specification.

A report author may select a customizable chart, that includes in its definition name/value pairs consisting of the identifiers and new values of customizable items. The authoring tool uses the localized display names when presenting choices to the report author.

The process further includes using an IBM Cognos visualization template to generate an SPSS visualization template. When the report specification is executed, the named IBM Cognos visualization template is retrieved. The values of the customizable items may be validated against the types. For example, the value "blue" would be accepted for a color but not for a dimension. The customized values provided then replace the existing values in the template.

The template is the transformed into an SPSS template by reversing the steps described earlier. The namespace is changed back to SPSS; styles are moved from being under an element to under the root; attributes are created from the child elements that represent them; and additions to the schema such as sts_names are removed from the document. The SPSS visualization template is then used as part of an SPSS script and executed, generating a visualization that is part of the report output.

An example implementation is provided as follows for a job flow in which a report author changes a chart title. This example uses an SPSS visualization template that may be installed as part of an IBM Cognos Statistics product. The process for converting the SPSS visualization schema to the IBM Cognos Statistics visualization schema is done as part of a build step by running a conversion tool. IBM SPSS Visualization Designer may be a different product that is sold separately from IBM Cognos Statistics, and may take the form of a desktop application. A chart designer may design a template, and save the template as an XML document.

Figure 4:
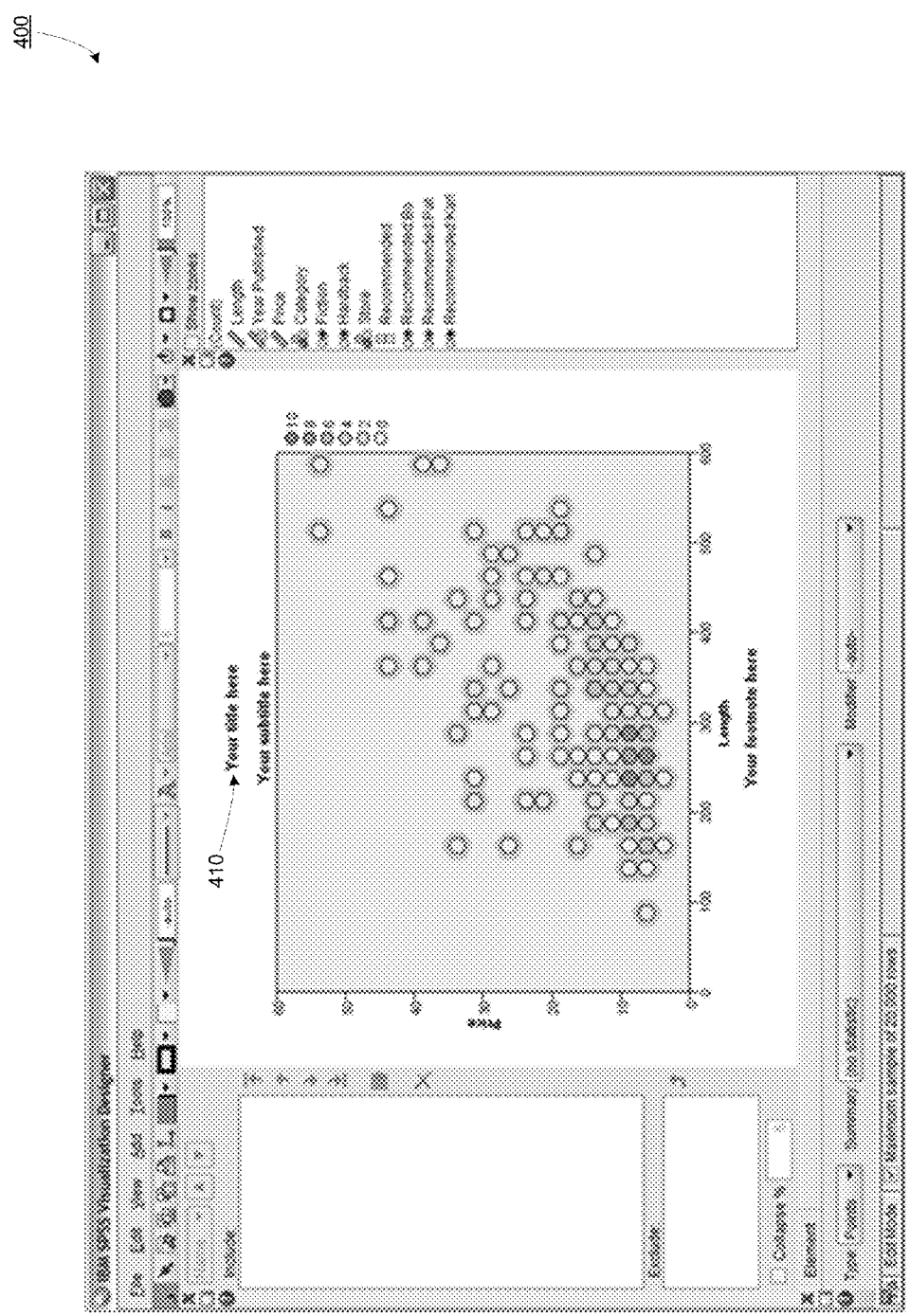
FIG. 4 is a screenshot of a secured custom document in the process of being created.

FIG. 4 depicts a screenshot 400 of a document in the process of being created based on a template, with some data added and modifications already made from a template by a document designer, while other elements remain in default values provided with the template, such as the title line 410, which reads "Your title here". This element may, for example, be generated in the source template with the following lines of XML:

```
<label id="label_3427" purpose="title" style="labelStyle5">
    <text id="text_3428">Your title here</text>
</label>
```

The IBM Cognos Statistic visualization template may be generated using an application program that may be written in Java, as an illustrative example, and that may convert the source template into a secured template, including converting the XML for the title element from the source template into the following XML in the secured template:

```
<label>
    ...
    <text id="text3">
        <sts_names>
            <sts_name>
                <sts_locale/>
                <sts_displayName>text3</sts_displayName>
            </sts_name>
        </sts_names>
        <sts_propertyType>text</sts_propertyType>Your title here</text>
</label>
```

The template author leaves the sts_propertyType element, generated as part of the secured template, in place, since she wants the title to be replaceable. However, the title may be translated for report authors into a more friendly name. Using an XML editor the template author changes the generated XML. The modified XML meets the schema that was generated.

```
<text id="text3">
    <sts_names>
        <sts_name>
            <sts_locale>en</sts_locale>
            <sts_displayName>Main Title</sts_displayName>
        </sts_name>
        <sts_name>
            <sts_locale>es</sts_locale>
            <sts_displayName>Principal Título</sts_displayName>
        </sts_name>
        <sts_name>
            <sts_locale/>
            <sts_displayName>Main Title</sts_displayName>
        </sts_name>
    </sts_names>
    <sts_propertyType>text</sts_propertyType>Your title here</text>
```

The template author passes the template to the system administrator who then copies it into the IBM Cognos installation directory.

Report authors can now create a chart using Report Studio. When the report author selects the chart they are presented with a list of properties. A Spanish-speaking author may see the property named "Principal Título" whose value is "Your title here". An English-speaking author may see the property named "Main Title" in the same place, while a French-speaking author may see the property named "titre principal". The author changes the value from "Your title here" to "Price per word count". Similarly, authors speaking different languages may see other user-modifiable properties in their own languages, such as a color for an element of the chart. The program may present a Spanish-speaking author with a property called "color" and a value of "morado", while in the same place it presents an English-speaking report author with a property called "color" and a value of "purple", or a French-speaking report author with a property called "couleur" and a value of "pourpre". The report author may replace the value with a different value in her own language, so for instance, a French-speaking report author may replace "pourpre" with "noir" for a property of an element of the chart such as the x-axis.

Returning to the example of the report author replacing "Your title here" with "Price per word count", when the report is executed, a name value map is sent to the Cognos Statistics application program that contains property value pairs, such as ("text3", "Price per word count"), that constitute user-indicated modifications. The Cognos Statistics application program replaces the property and generates a new, secured template, after verifying that the property value is valid for the identified type.

```
<text id="text3">
    <sts_names>
        <sts_name>
            <sts_locale>en</sts_locale>
            <sts_displayName>Main Title</sts_displayName>
        </sts_name>
        <sts_name>
            <sts_locale>es</sts_locale>
            <sts_displayName>Principal Título</sts_displayName>
```

```
        </sts_name>
        <sts_name>
            <sts_locale/>
            <sts_displayName>Main Title</sts_displayName>
        </sts_name>
    </sts_names>
    <sts_propertyType>text</sts_propertyType>verbosity value</text>
```

The new template is checked against the generated schema, as part of the security measures. The statistics service template is then converted back to an SPSS template, where is it verified against the original schema.

```
<label id="label_3427" purpose="title" style="labelStyle5">
    <text id="text_3428">verbosity value</text>
</label>
```

The Cognos application program then calls SPSS to generate the chart with the new values, thereby creating a secured custom document in SPSS based on the custom document modified from the secured template in Cognos.

Figure 5:
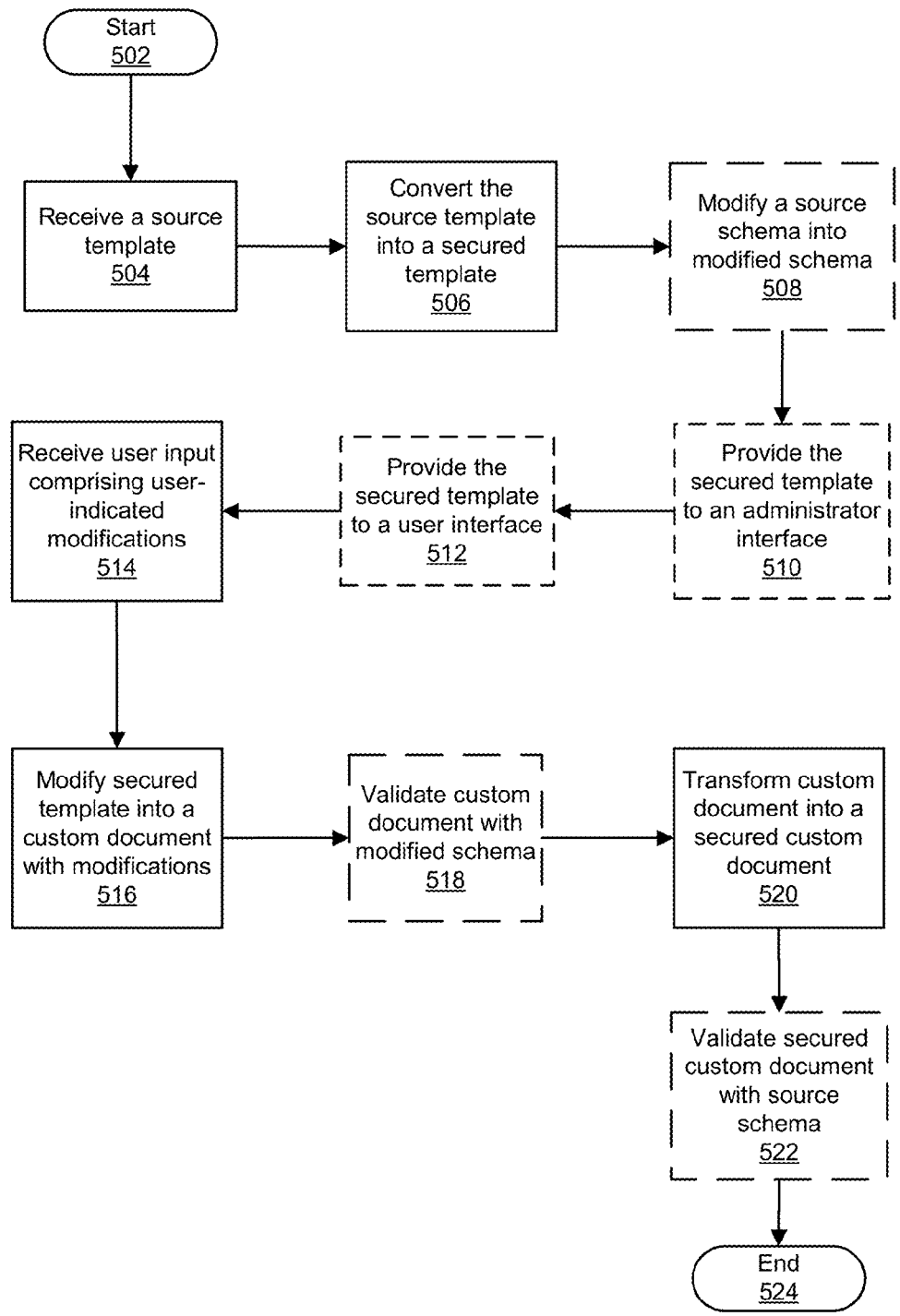
FIG. 5 is a flowchart of a process using the system of FIG. 3 in accordance with one embodiment of the disclosure.

FIG. 5 depicts a flowchart of a process 500 for generating secured documents using a source template, in accordance with an example embodiment. Process 500 is an example of a process for generating secured documents using a source template using system 300 of FIG. 3. The elements of process 500 are described as follows in terms of being performed by a system, which may include any element of any example system as described above, with different elements of the process potentially being performed by the same or different system components. Process 500 may be performed entirely by a system executing secure application environment 305 of FIG. 3 in various example embodiments.

After process 500 begins (502), a system receives a source template (504), and may also optionally receive a source schema with the source template. The system converts the source template into a secured template (506). The secured template includes user-modifiable extension points, while the secured template is not user-modifiable outside of the extension points. The system may also optionally modify a source schema into a modified schema (508). The system may optionally provide the secured template to an administrator interface (510), where a user with administrator authorization may have the option of changing one or more of the user-modifiable extension points to non-user-modifiable. The system may optionally provide the secured template to a user interface (512), through which the system receives user input comprising user-indicated modifications at one or more of the extension points (514). The system may use any of a variety of means to receive the user input. In one illustrative example, the system may include a web application running on a web server and exchanging information with a browser running on a client computing device. The web application may present the secured template with a user interface in the browser, and enable a user to enter user inputs defining the user-indicated modifications at one or more of the extension points (514). The system modifies the secured template into a custom document with modifications to the one or more extension points in accordance with the user-indicated modifications (516). The system may optionally validate the custom document with the modified schema (518). The system transforms the custom document into a secured custom document (520) that comprises the modifications to the one or more extension points, and that is in a format that is executable using the source schema associated with the source template. The system may also optionally validate the secured custom document with the source schema (522) prior to finishing (524). Thus, the system performs a process 500 for generating secured documents using a source template, in accordance with an example embodiment.

The user-modifiable extension points may include user-modifiable elements, and converting the source template into the secured template may include adding an attribute to each of one or more of the user-modifiable elements indicating a property type of the element.

Converting the source template into the secured template may include replacing one or more attributes in the source template with one or more corresponding attribute definitions in the secured template. Converting the source template into the secured template may include replacing one or more attributes, such as type, style, or color attributes, in the source template with one or more corresponding child elements in the secured template. Replacing one or more attributes in the source template with one or more corresponding elements in the secured template may include replacing a shared attribute in the source template with individualized child elements in the secured template.

Converting the source template into the secured template may include making one or more file paths in the source template non-user-modifiable in the secured template.

Providing the secured template to a user interface may include providing options for a user with administrator authorization to change one or more of the user-modifiable extension points to non-user-modifiable by a user without administrator authorization.

Process 500 may further include verifying that property values of the indicated modifications are valid for the identified type for the indicated modifications, prior to transforming the secured template into the secured custom document that comprises modifications to the one or more extension points in accordance with the indicated modifications.

Process 500 may further include converting the source schema into a modified schema configured to validate the custom document comprising the modifications to the one or more extension points. This may further include verifying that the custom document can be validated by the modified schema, prior to transforming the custom document.

Process 500 may further include verifying that the secured custom document can be validated by the source schema, after transforming the custom document. Process 500 may also include generating a visualization chart based on the secured custom document.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various aspects of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments described above were chosen and described in order to explain various principles of the invention and various practical applications thereof, and to enable others of ordinary skill in the art to understand the invention for various embodiments with various modifications as are suited to the particular use contemplated.

Various aspects of invention can take the form of an entirely hardware embodiment, an entirely software embodiment or an embodiment containing both hardware and software elements. In one embodiment, the invention is implemented in software, which includes but is not limited to firmware, resident software, microcode, and other software media that may be recognized by one skilled in the art.

While various aspects of the present invention have been described in the context of a functioning computer system, those of ordinary skill in the art will appreciate that one or more aspects of the present invention are capable of being distributed in the form of a computer readable medium of instructions and a variety of forms. The computer readable media may take the form of coded formats that are decoded for actual use in a particular computer system.

A computer system suitable for storing and/or executing program code includes at least one processor coupled directly or indirectly to memory elements through a bus or other communication fabric. The memory elements can include local memory employed during actual execution of the program code, bulk storage, and cache memories which provide temporary storage of at least some program code in order to reduce the number of times code is to be retrieved from bulk storage during execution. Input/output or I/O devices (including but not limited to keyboards, displays, pointing devices, etc.) can be coupled to the system either directly or through intervening I/O controllers. One or more network adapters may also be coupled to the system to enable the computer system to become coupled to other computer systems or remote printers or storage devices through intervening private or public networks. The network adapters may include modems, cable modems, and Ethernet cards, for example.

Based on the foregoing, various embodiments of a computer system, method and program product are disclosed herein for generating secured documents using a source template. However, numerous modifications and substitutions can be made without deviating from the scope of the present invention. Therefore, the present invention is disclosed by way of example and not limitation.

What is claimed is:

1. A method implemented by a computing system to generate secured documents using a source template, the method comprising:
   receiving the source template that is configured in accordance with a first format compatible with a first computer program;
   receiving a source schema associated with the source template, the source schema defining the first format;
   converting the source template into a secured template, wherein the secured template is configured in accordance with a second format compatible with a second computer program, the second format being different than the first format, wherein the first format is incompatible with the second computer program, and wherein converting the source template into the secured template comprises:
   determining, by the computing system and based on indications contained in the source schema, one or more parts of the source template where modification is permitted, the one or more parts of the source template comprising an element of the source template that references a common style of the source template, and
   adding, by the computing system, user-modifiable extension points at the determined one or more parts of the source template to create the secured template, wherein adding the user-modifiable extension points comprises creating at least one child element of the element of the source template and copying at least a portion of the common style referenced by the element to the at least one child element,
   wherein the secured template is not user-modifiable outside of the user-modifiable extension points;
   receiving user input comprising one or more user-indicated modifications at one or more of the user-modifiable extension points;
   modifying the secured template into a custom document with modifications to the one or more user-modifiable extension points in accordance with the one or more user-indicated modifications, wherein the custom document is compatible with the second computer program; and
   transforming the custom document into a secured custom document that comprises the modifications to the one or more user-modifiable extension points and that is in a format executable using the source schema, wherein the secured custom document is compatible with the first computer program, and wherein transforming the custom document into the secured custom document comprises:
   creating a respective at least one individualized style within the secured custom document; and
   copying at least a portion of a style defined within the at least one child element to the respective at least one individualized style.

2. The method of claim 1, wherein the one or more parts of the source template further comprise at least one user-modifiable element, and wherein adding the user-modifiable extension points further comprises adding an attribute to the at least one user-modifiable element indicating a property type of the element.

3. The method of claim 1, wherein adding the user-modifiable extension points further comprises replacing one or more attributes in the source template with one or more corresponding attribute definitions.

4. The method of claim 1, wherein adding the user-modifiable extension points further comprises replacing one or more attributes in the source template with one or more corresponding child elements.

5. The method of claim 1, wherein converting the source template into the secured template further comprises making one or more file paths in the source template non-user-modifiable in the secured template.

6. The method of claim 1, further comprising outputting, via a user interface of the second computer program, the secured template.

7. The method of claim 6, wherein outputting the secured template comprises providing options for a user with administrator authorization to change one or more of the user-modifiable extension points to non-user-modifiable for a user without administrator authorization.

8. The method of claim 1, further comprising:
verifying that property values of the user-indicated modifications are valid for an identified type for the user-indicated modifications, prior to transforming the secured template into the custom document that comprises the modifications to the one or more user-modifiable extension points in accordance with the user-indicated modifications.

9. The method of claim 1, further comprising:
converting the source schema into a modified schema configured to validate the custom document comprising the modifications to the one or more user-modifiable extension points.

10. The method of claim 9, further comprising:
verifying that the custom document can be validated by the modified schema, prior to transforming the custom document.

11. The method of claim 1, further comprising:
verifying that the secured custom document can be validated by the source schema, after transforming the custom document.

12. The method of claim 1, further comprising:
generating, via the first computer program, a visualization chart based on the secured custom document.

13. A computer system to generate secured documents using a source template, the computer system comprising:
one or more processors and one or more computer-readable data storage devices;
program instructions, stored on at least one of the one or more data storage devices for execution by at least one of the one or more processors, to receive the source template that is configured in accordance with a first format compatible with a first computer program;
program instructions, stored on at least one of the one or more data storage devices for execution by at least one of the one or more processors, to receive a source schema associated with the source template, the source schema defining the first format;
program instructions, stored on at least one of the one or more data storage devices for execution by at least one of the one or more processors, to convert the source template into a secured template, wherein the secured template is configured in accordance with a second format compatible with a second computer program, the second format being different than the first format, wherein the first format is incompatible with the second computer program, and wherein the program instructions to convert the source template into the secured template comprise program instructions to:
determine, based on indications contained in the source schema, one or more parts of the source template where modification is permitted, the one or more parts of the source template comprising an element of the source template that references a common style of the source template, and
add user-modifiable extension points at the determined one or more parts of the source template to create the secured template, wherein adding the user-modifiable extension points comprises creating at least one child element of the element of the source template and copying at least a portion of the common style referenced by the element to the at least one child element,
wherein the secured template is not user-modifiable outside of the user-modifiable extension points;
program instructions, stored on at least one of the one or more data storage devices for execution by at least one of the one or more processors, to receive a user input comprising one or more user-indicated modifications at one or more of the user-modifiable extension points;
program instructions, stored on at least one of the one or more data storage devices for execution by at least one of the one or more processors, to modify the secured template into a custom document with modifications to the one or more user-modifiable extension points in accordance with the one or more user-indicated modifications, wherein the custom document is compatible with the second computer program; and
program instructions, stored on at least one of the one or more data storage devices for execution by at least one of the one or more processors, to transform the custom document into a secured custom document that comprises the modifications to the one or more user-modifiable extension points and that is in a format that is executable using the source schema, wherein the secured custom document is compatible with the first computer program, and wherein the program instructions to transform the custom document into the secured custom document comprise program instructions to:
create a respective at least one individualized style within the secured custom document; and
copy at least a portion of a style defined within the at least one child element to the respective at least one individualized style.

14. The computer system of claim 13, wherein the program instructions to convert the source template into the secured template further comprise program instructions, stored on at least one of the one or more data storage devices, to replace one or more attributes in the source template with one or more corresponding attribute definitions or child elements.

15. The computer system of claim 13, wherein the program instructions to convert the source template into the secured template further comprise program instructions, stored on at least one of the one or more data storage devices, to make one or more file paths in the source template non-user-modifiable.

16. The computer system of claim 13, further comprising:
program instructions to convert the source schema into a modified schema configured to validate the custom document comprising the modifications to the one or more user-modifiable extension points; and
program instructions to verify that the custom document can be validated by the modified schema.

17. The computer system of claim 13, further comprising:
program instructions to verify that the secured custom document can be validated by the source schema.

18. The computer system of claim 13, further comprising:
program instructions to provide options for a user with administrator authorization to change one or more of the user-modifiable extension points to non-user-modifiable for a user without administrator authorization.

19. A computer program product for generating secured documents using a source template, the computer program product comprising:
one or more non-transitory computer-readable media having computer-readable program instructions stored thereon, the computer-readable program instructions comprising:
computer-readable program instructions to receive the source template that is configured in accordance with a first format compatible with a first computer program;
computer-readable program instructions to receive a source schema associated with the source template, the source schema defining the first format;
computer-readable program instructions to convert the source template into a secured template, wherein the secured template is configured in accordance with a second format compatible with a second computer program, the second format being different than the first format, wherein the first format is incompatible with the second computer program, and wherein the computer-readable program instructions to convert the source template into the secured template comprise computer-readable program instructions to:
determine, based on indications contained in the source schema, one or more parts of the source template where modification is permitted, the one or more parts of the source template comprising an element of the source template that references a common style of the source template, and
add user-modifiable extension points at the determined one or more parts of the source template to create the secured template, wherein adding the user-modifiable extension points comprises creating at least one child element of the element of the source template and copying at least a portion of the common style referenced by the element to the at least one child element,
wherein the secured template is not user-modifiable outside of the user-modifiable extension points;
computer-readable program instructions to receive a user input comprising one or more user-indicated modifications at one or more of the user-modifiable extension points;
computer-readable program instructions to modify the secured template into a custom document with modifications to the one or more user-modifiable extension points in accordance with the one or more user-indicated modifications, wherein the custom document is compatible with the second computer program; and
computer-readable program instructions to transform the custom document into a secured custom document that comprises the modifications to the one or more user-modifiable extension points and that is in a format that is executable using the source schema, wherein the secured custom document is compatible with the first computer program, and wherein the computer-readable program instructions to transform the custom document into the secured custom document comprise computer-readable program instructions to:
create a respective at least one individualized style within the secured custom document; and
copy at least a portion of a style defined within the at least one child element to the respective at least one individualized style.

20. The computer program product of claim 19, wherein the computer-readable program instructions to convert the source template into the secured template further comprise program instructions, stored on at least one of the one or more data storage devices, to replace one or more attributes in the source template with one or more corresponding attribute definitions or child elements in the secured template.

21. The computer program product of claim 19, wherein the computer-readable program instructions to convert the source template into the secured template further comprise program instructions, stored on at least one of the one or more data storage devices, to make one or more file paths in the source template non-user-modifiable.

22. The computer program product of claim 19, wherein the computer-readable program instructions further comprise:
computer-readable program instructions to convert the source schema into a modified schema configured to validate the custom document comprising the modifications to the one or more user-modifiable extension points; and
computer-readable program instructions to verify that the custom document can be validated by the modified schema.

23. The computer program product of claim 19, wherein the computer-readable program instructions further comprise:
computer-readable program instructions to verify that the secured custom document can be validated by the source schema.

24. The computer program product of claim 19, wherein the computer-readable program instructions further comprise:
computer-readable program instructions to make the user-modifiable extension points non-user-modifiable by a user with administrator authorization.

* * * * *